United States Patent [19]

Honda et al.

[11] Patent Number: 4,712,961
[45] Date of Patent: Dec. 15, 1987

[54] APPRATUS FOR STACKING SHAPED MATERIALS ON A PALLET

[75] Inventors: Masahiro Honda; Hironari Maeda, both of Ube, Japan

[73] Assignee: Ube Industries, Ltd., Japan

[21] Appl. No.: 761,703

[22] Filed: Aug. 2, 1985

[30] Foreign Application Priority Data

Aug. 3, 1984 [JP] Japan .................. 59-162842

[51] Int. Cl.$^4$ .............................. B65G 57/18
[52] U.S. Cl. .......................... 414/42; 414/84
[58] Field of Search ............. 414/42, 69, 76, 81, 414/82, 84; 198/631

[56] References Cited

U.S. PATENT DOCUMENTS

| 769,947 | 9/1904 | Kramer | 198/631 X |
|---|---|---|---|
| 3,081,888 | 3/1963 | Lawson | 414/42 X |
| 3,904,047 | 9/1975 | Lunden | 414/42 |
| 4,104,847 | 8/1978 | Glandon et al. | 198/631 X |
| 4,253,787 | 3/1981 | Lunden et al. | 414/42 |
| 4,264,253 | 4/1981 | Kennison | 414/42 |
| 4,324,521 | 4/1982 | Lunden et al. | 414/42 |
| 4,384,814 | 5/1983 | Moseley | 414/42 |

FOREIGN PATENT DOCUMENTS 2400294 7/1975 Fed. Rep. of Germany ........ 414/42
61-45827 3/1986 Japan .

Primary Examiner—Robert J. Spar
Assistant Examiner—Janice Krizek
Attorney, Agent, or Firm—Finnegan, Henderson, Farabow, Garrett & Dunner

[57] ABSTRACT

An apparatus is used for stacking elongated shapes on a pallet with the insertion of spacers between the individual adjacent shapes. A plurality of elongated tables are arranged in parallel to each other for supporting a predetermined number of the shapes supplied one by one in the longitudinal direction of the tables perpendicular to the shapes. A spacer conveyor extends under and perpendicular to the tables for feeding spacers one by one from a spacer supply. A plurality of transfer frames are each arranged in parallel to each table and are movably supported in the longitudinal direction thereof from a retracted position to a stacking station. The transfer frame has spacer receivers for bringing the spacers to the stacking station. A conveyor belt extends over the transfer frame for feeding the shapes to the stacking station, where the shapes and spacers are alternately stacked on a pallet.

4 Claims, 17 Drawing Figures

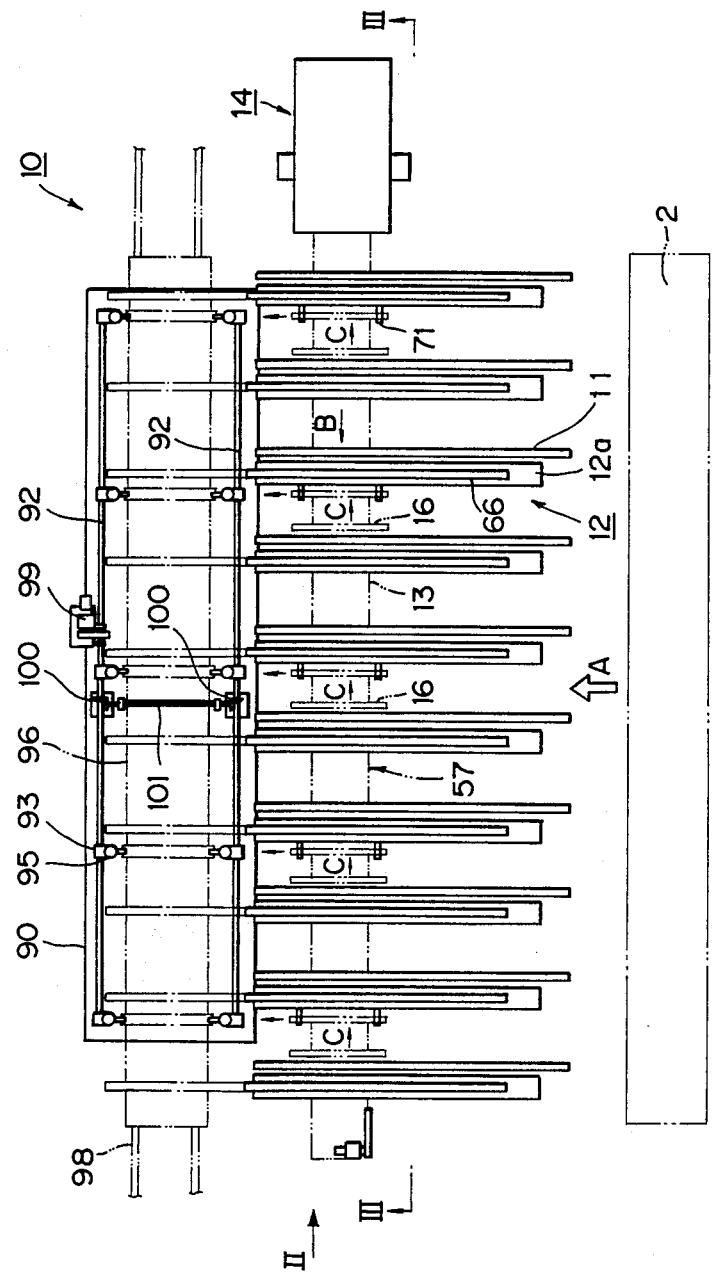

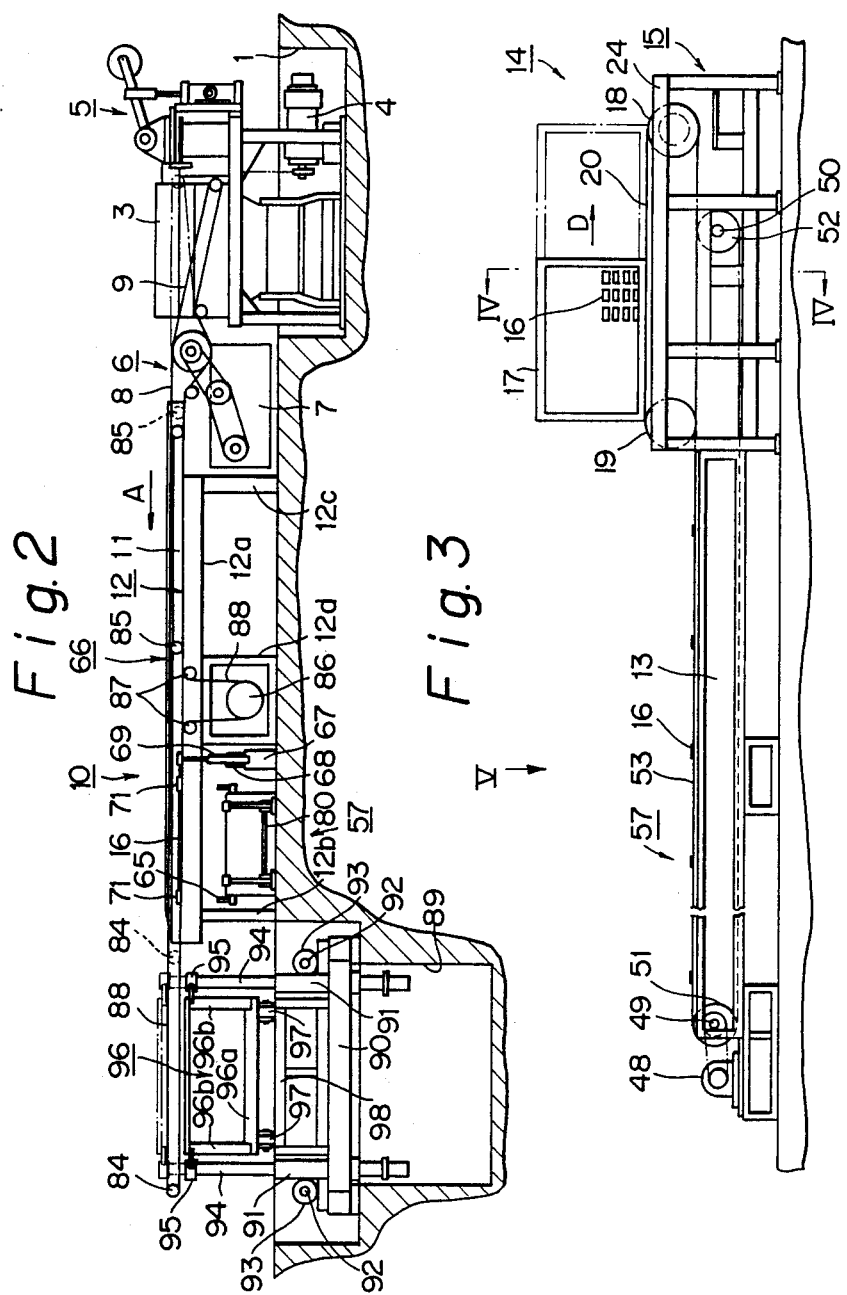

Fig.IOG
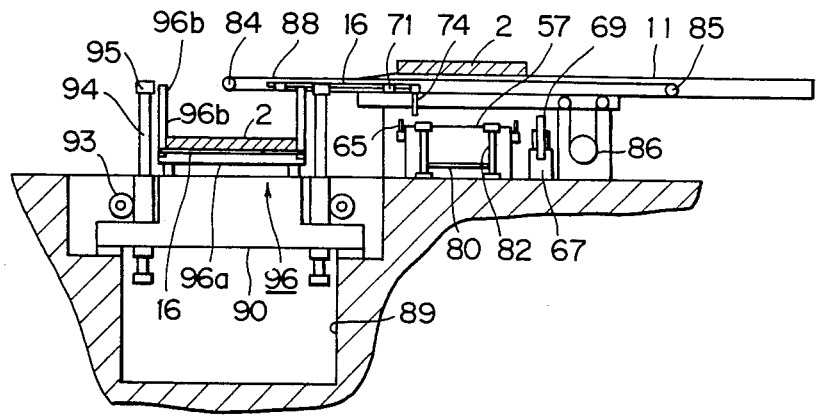
Fig.IOH
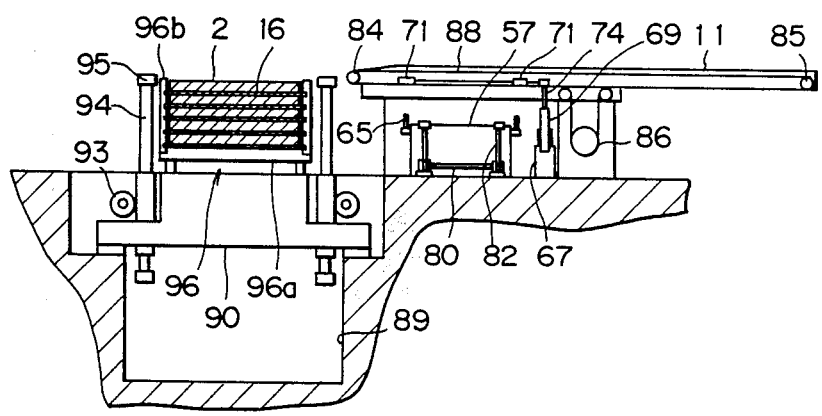

APPRATUS FOR STACKING SHAPED MATERIALS ON A PALLET

BACKGROUND OF THE INVENTION

1. Field of the Invention

This invention relates to an apparatus for stacking shaped materials on a pallet, in which elongated shaped metals, or plastic pipes or tubes, or the like, hereinafter generically referred to as "shapes", which are, for example, cut into individual elongated shapes after having been extruded from an extruding press or rolled by a rolling machine, are stacked or piled one by one on a pallet with the insertion of spacers between the respective adjacent shapes.

2. Description of the Related Art

Shapes of the type as mentioned above are usually transported onto a standard length table, where they are cut into individual shapes, after having been extruded from an extruding press or rolled by a rolling machine. These shapes are then fed one by one in a direction perpendicular to the previous longitudinal feeding direction thereof to the standard length table and arranged side by side in line on an inspection table. In order to transport these shapes to a certain storage place by using suitable carts, these shapes are conventionally stacked or piled one by one, with the insertion of spacers between respective adjacent layers, onto a pallet of frame structure which is adapted to be mounted on the cart. The loading operations of spacers onto a pallet in the prior art requires a lot of labor, since several operators have to cooperate to load these shapes one by one with manual operations. In addition, in the recent years, the size of shapes becomes larger and larger so that the loading requires more severe and dangerous operations. Therefore, any suitable machines for loading or stacking these shapes have been desired and various types of such machines have been proposed.

A chain conveyor type loading machine is known, in which shapes supplied from a standard length table in a direction perpendicular to the longitudinal or axial direction thereof are turned one by one to be in the axial direction and transferred by a roller table. Then, the shapes are conveyed by a chain conveyor under which there is a rack mounted on a car movable in a pit, so that the shapes fall down one by one into the rack and at the same time spacers are intermittently inserted between the individual shapes by a suitable spacer feeder.

An overhead type loading machine is also known, in which a roller table and a pallet having wheel trucks are arranged in parallel under a gate-shaped frame, and a lift having an electric magnet at the lower end thereof is suspended from the frame so as to magnetically hold the shapes and move the shapes repeatedly between the roller table and the pallet for loading the shapes onto the pallet. In this case, spacers are also intermittently inserted between the individual shapes by a spacer feeder.

However, these conventional loading machines have some disadvantages. For instance, in the chain conveyor type loading machine, it is difficult to secure enough space for loading due to its structure, means for moving the rack to or from the loading position are complicated, and it is also difficult to smoothly insert the spacers between the individual shapes. On the other hand, in the overhead type loading machine, since the lift moves over the operator's heads, the operations are dangerous and not suited for large and long sized shapes. In addition, the cycle of operation is relatively long, and the insertion of spacers is also difficult.

Some other types of loading machines are also known in the prior art. However, they are types of manual or incomplete automatic operations including manual inserting operation of spacers, which operate in the same manner as the two above mentioned known machines.

SUMMARY OF THE INVENTION

Accordingly, it is an object of the present invention to provide an improved loading apparatus for fully automatically stacking shapes onto a pallet, which enables high speed and effective loading operations of the shapes and inserting operations of spacers, as well as reduces dangerous laboratory conditions for the operators.

Therefore, according to the present invention, there is provided an apparatus for stacking elongated shapes onto a pallet with the insertion of spacers between the individual adjacent shapes comprising: a plurality of elongated tables arranged in parallel to each other, each table horizontally extending from a shape supplying station, the table being adapted to support thereon a predetermined number of shapes which are supplied onto the tables one by one in na longitudinal direction of the tables which is perpendicular to the longitudinal direction of the shapes; a spacer conveyor arranged under the tables and extending perpendicularly thereto for feeding spacers one by one from a spacer supplying machine located outside of the tables, the spacer conveyor including means for simultaneously stopping the spacers at a predetermined number of first positions each located between the tables and means for simultaneously lifting the spacers to second positions adjacent the tables; a plurality of elongated transfer frames each arranged in parallel to each of the tables and movably supported in the longitudinal direction thereof from a retracted position to a projected position wherein each transfer frame is projected to a stacking station, the transfer frames each including means for receiving each of the spacers in the second position so as to bring it to the stacking station; a plurality of conveyor belts each extending along and movably supported on the transfer frame in the longitudinal direction thereof for feeding the shapes one by one from the tables to the stacking station; and means for alternately loading the foremost shape and a predetermined number of spacers onto the pallet at the loading station, and repeating the same so as to make several piles of the shapes, the loading means including spacer lifters having spacer holders for placing the shape and the spacers at the stacking station by slightly lifting up the spacers by the holders and for stacking said shape with the spacers on the pallet by lowering the spacers by said holders, while the transfer frames and the conveyor belts are retracted from the stacking station.

The accompanying drawings, which are incorporated in and constitute a part of this specification, illustrate one embodiment of the invention and together with the description, serve to explain the principles of the invention.

BRIEF DESCRIPTION OF THE DRAWINGS

FIGS. 1 through 9 and 10A through 10H illustrate an embodiment of an apparatus for stacking or piling shapes onto a pallet according to the present invention, wherein:

FIG. 1 is a plan view schematically illustrating the whole of this apparatus;

FIG. 2 is an enlarged side elevational view as seen from arrow II in FIG. 1 and illustrating a shape transfer machine and a spacer conveyor;

FIG. 3 is an enlarged cross-sectional view taken along line III—III in FIG. 1 and illustrating a spacer supplying machine and a spacer conveyor;

FIG. 4 is an enlarged cross-sectional view taken along line IV—IV in FIG. 3 and illustrating a spacer supplying machine in detail;

FIG. 5 is a schematic plan view seen from arrow V in FIG. 3 and illustrating spacer feeding and lifting mechanisms;

FIG. 6 is a cross-sectional view taken along line VI—VI in FIG. 5 and illustrating a spacer positioning mechanism;

FIG. 7 is a cross-sectional view taken along line VII—VII in FIG. 6;

FIG. 8 is an elevational view seen from arrow VIII in FIG. 5 and illustrating a mechanism for turning a spacer receiving arm;

FIG. 9 is a cross-sectional view taken along line IX—IX in FIG. 5 and illustrating the spacer lifting mechanism; and FIGS. 10A through 10H are schematic elevational views for illustrating, in series, loading and stacking operations of shapes with spacers being inserted between the individual adjacent shapes.

DESCRIPTION OF THE PREFERRED EMBODIMENT

Figure 4:
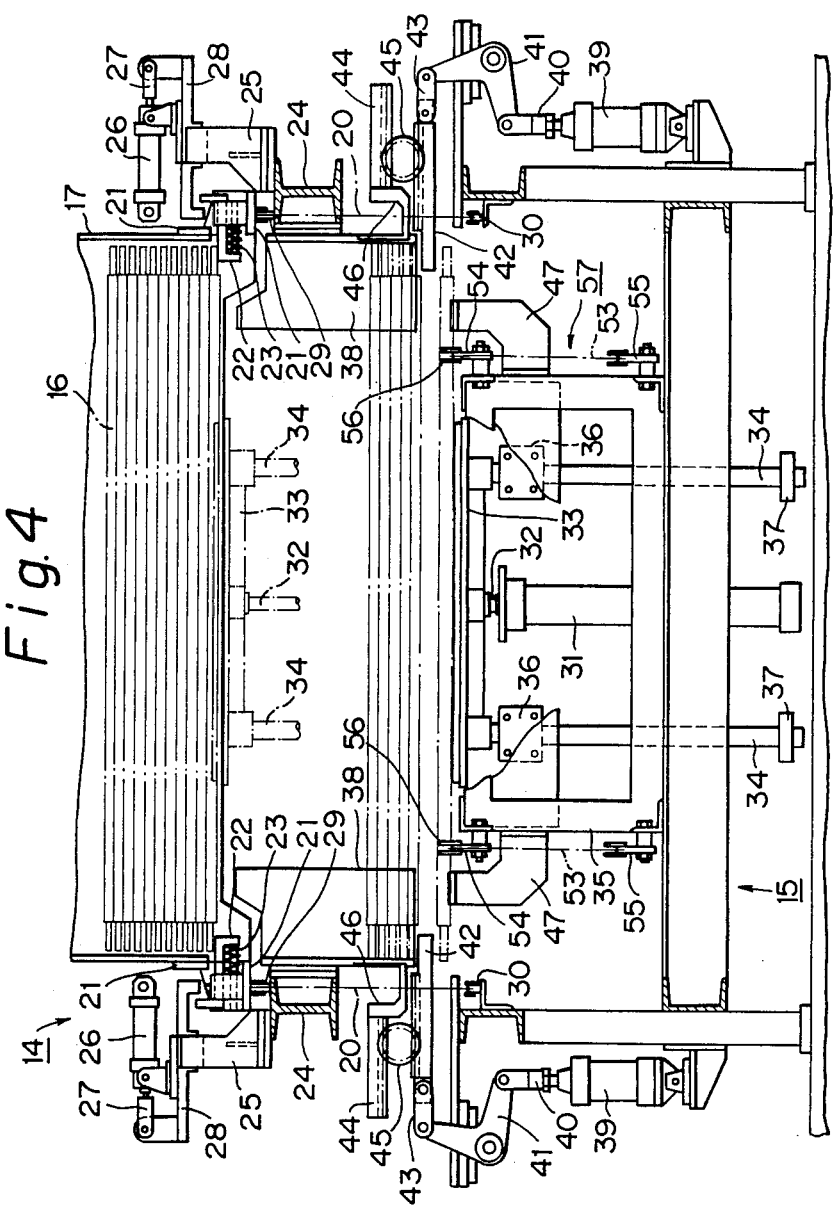

Reference will now be made in detail to the present preferred embodiment of the invention, an example of which is illustrated in the accompanying drawings. Wherever possible, the same reference numbers will be used throughout the drawings to refer to the same or like parts.

Referring now to the drawings, an embodiment of the stacking or piling apparatus 10 according to the present invention is generally illustrated in plan view in FIG. 1. In this embodiment, an elongated shaped material of metal, such as aluminium, copper or the like, extruded from any suitable extruding press (not shown) and cut into individual elongated rectangular shapes, as indicated by reference numeral 2 in FIG. 1, are fed one by one from their supplying station in the direction shown by arrow A perpendicular to the longitudinal direction thereof. On the other hand, a plurality of hollow rod-shaped spacers 16 are supplied one by one, as shown by arrow B, from a spacer supplying machine 14 by means of a spacer conveyor as generally indicated by reference numeral 57 extending in parallel to the elongated shapes 2. After their positions are corrected, as indicated by arrows C, the spacers 16 are simultaneously fed to a stacking or loading station where a pallet 96 is located, on which the shapes 2 and spacers 16 are alternately loaded to make several piles of shapes.

This embodiment will now be further discussed hereinafter in detail. In FIG. 2, a pit 1 is provided therein with a standard length table 3 which supports and stops at a predetermined position an elongated material extruded and fed in a direction perpendicular to the sheet face of drawing from back to front. A hot saw 5 driven by a motor 4 rigidly is secured to the table 3 for cutting the elongated material into individual shapes 2.

A transfer machine 6 comprises transfer belt 8 driven by a motor (not shown) in a frame 7 and a swingable transfer belt 9, which swings from a position indicated by a dotted line to a position indicated by solid line, when the elongated material is cut into a predetermined number of shapes by the hot saw 5 and arranged in parallel in line on the standard length table 3, so as to transfer a group of the shapes 2 to a conveyor belt 88 of the stacking apparatus generally indicated by reference numeral 10 in FIGS. 1 and 2, as mentioned hereinafter.

Figure 8:
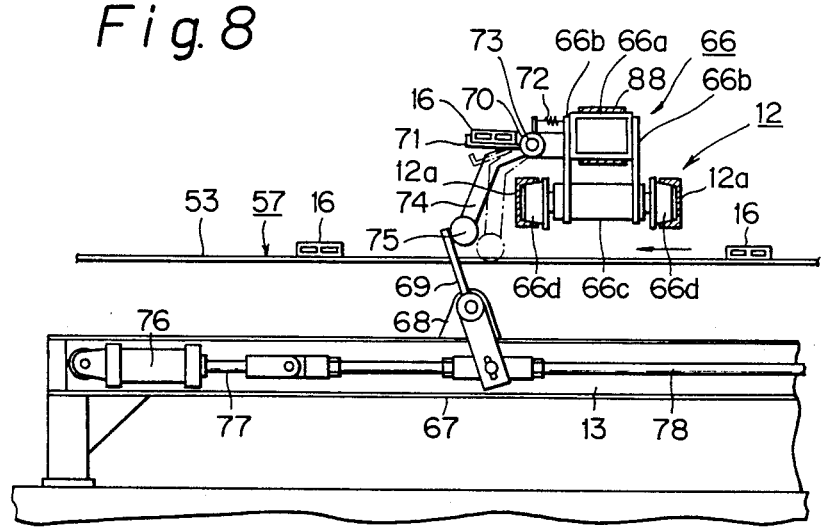

The stacking apparatus 10 comprises a plurality of inspection tables 11, hereinafter referred to simply as "table", such as ten tables 11 in this embodiment as shown in FIG. 1, extending perpendicular to the longitudinal or axial direction of the shapes 2 and arranged in parallel to each other in the feeding direction A in FIG. 1. Each of the tables 11 is integrally supported on a support frame 12 so that the upper surface of the table 11 is a little higher than the transfer or feed belt 8. Each table 11 is provided over the entire length thereof with another feed belt (not shown) arranged in a position substantially at the same horizontal level as the upper surface of the table 11. Each of the support frames 12 is, as shown in FIG. 8, comprised integrally of a pair of rails 12a, extending in parallel to the table 11 and having substantially U-shaped cross-sections, and legs 12b, 12c and 12d for supporting the rails 12a above the floor.

Between the leg 12b and the frame 12d, in FIG. 2, the transferring route of the spacers extends, as mentioned hereinafter, perpendicular to the feeding direction A of the shapes 2.

In FIGS. 1 and 3, a conveyor frame structure 13 is fixed on the floor and arranged between the leg 12b (FIG. 2) and leg 12d (FIG. 2) of each support frame 12 so as to be perpendicular thereto. At one end of this conveyor frame 13 there is provided a spacer supplying machine 14 as shown in detail in FIG. 4, which is exactly symmetrical with respect to the left and right hand sides thereof.

The spacer supplying machine 14 comprises a frame structure 15 fixed on the floor, above which there is provided a cassette box 17 supported on a pair of chains 20 extended over front and rear pairs of sprockets 18 and 19. In this cassette box 17, a number of elongated hollow spacers 16 each having a rectangular cross-section are stackered one by one in several rows and piles, in the down-to-up and front-to-rear directions, as shown in FIG. 3. Each of the chains 20 is supported by chain guides 29 and 30 (FIG. 4) provided in each side of the support structure 15. The chains 20 are driven in a predetermined timing by a reversible motor so that the cassette box 17 is moved reciprocally, since the both sides thereof are secured to the chains 20 by means of L-shaped support members 21 fixed to the upper running portions of the chains 20.

When the cassette box 17 is in its starting point, as shown by a solid line in FIG. 3, the spacers 16 of the foremost row in the box 17 are positioned about the center of the frame structure 15 with respect to the front-to-rear direction. In this state, if the motor drives the chains 20 intermittently in the forward direction in a predetermined timing, the cassette box 17 is moved as shown by arrow D step by step by a distance corresponding to a pitch between respective rows of the spacers 16 in the cassette box 17. The cassette box 17 is thus moved to the right indicated by a dotted line in FIG. 3 and then moved reversely to the initial position by rotating the motor in the reverse direction.

In FIG. 4, a pair of elongated support members 21 are each provided with a plurality of S-shaped spacer receivers 22 arranged thereon in the same pitch as the pitch of the rows of the spacers 16 and each slidable in the horizontal transverse direction so that they are urged inward to the inside of the cassette box 17 by compression coil springs 23 so as to support respective ends of the spacers 16. On the other hand, in FIG. 4, a pair of air cylinders 26 are pivotably mounted on respective brackets 25 each fixed on a central portion of the frame structure 15. A piston rod 27 of each air cylinder 26 is pivotably connected to one end of a hook 28 slidably supported on the bracket 25. The hook 28 is, in turn, aligned with the spacer receivers 22 moving forward step by step, as mentioned above, so that in this aligned position the spacer receiver 22 is outwardly moved against the compression coil spring 23 by the forward movement of the piston rod 27 of the air cylinder 26, so as to release the spacers 16 in the line in question.

A central vertical air cylinder 31 supported on the frame structure 15 has its piston rod 32 to which a receiving plate 33 having substantially the same width as the spacer 16 is rigidly attached. A pair of guide shafts 34 extending downward from the respective ends of the receiving plate 33 are supported slidingly in the up-and-down direction by bearings or guide members 36 fixed to the frame structure 15. With the downward movement of the piston rod 32 of the air cylinder 31 from a position of spacers 16 as shown in a dotted line in FIG. 4, a row of spacers 16 released from the spacer receivers 22 are also brought down. The guide shafts 34 have respective stoppers 37 which limit the uppermost and lowermost positions of the receiving plate 33. On the other hand, during the downward movement of the spacers 16, they are guided by a pair of opposite vertical guide plates 38 rigidly mounted on the upper beams 24.

In addition, there is provided a means which supports the spacers 16 just before they reach their lowest position. Such a supporting means comprises a pair of air cylinders 39 each pivotably mounted on the support structure 15 and having a piston rod 40 pivotably connected to one end of an L-shaped lever 41 pivotably mounted on each side of the frame structure 15. The other end of the L-shaped lever 41 is pivotably connected to another lever 43 which in turn is pivotably connected to one end of a rack member 42 which is movable in the horizontal transverse direction. Between this rack 42 and an upper corresponding rack 44 which is also slidable in the horizontal transverse direction, a pinion 45 engaging both racks 42 and 44 is rotatably supported on each side of the frame structure 15, so that by rotating the pinion 45, the upper and lower racks 42 and 44 are moved in opposite directions with respect to each other. When the lower rack 42 is in its forward position, i.e., in its inward position, a pair of the racks 42 support by their step portions the ends of the spacer 16, and the upper pair of racks 44 are retracted from the spacer 16. If the lower pair of racks 42 are retracted outward from the positions shown in FIG. 4, the upper pair of racks 44 are moved forward so that a pair of holders 46 integrally attached to the inner end of the racks 44, respectively, are inserted into the hollow portion of a second spacer 16 to support it. Additionally, the lowest spacer 16, released from the lower pair of racks 42, comes down to be supported on a pair of spacer receivers 47 protruding from a frame part 35 of the structure 15.

The spacers 16 brought one by one onto the pairs of spacer receivers 47 and supported thereby are then transported by a spacer conveyor 57 to predetermined positions to be joined with the shape 2, as will be discussed in detail as follows.

As seen from FIG. 3, at the rear end of the conveyor frame 13 there is rotatably mounted thereon a driving shaft 49 which is connected to a motor 48 by a belt. Additionally, a driven shaft 50 is rotatably supported on the above-mentioned frame structure 15 at about the central part thereof. The driving and driven shafts 49 and 50 carry respective pairs of left and right sprockets 51 and 52 over which a pair of left and right conveyor chains 53 are extended along chain guides 54 and 55 (FIG. 4). As seen from FIG. 4, the pair of these chains 53 carry a plurality of pushers 56 which in turn push the spacers 16 supported by the above-mentioned spacer receivers 47, at predetermined intervals, and thereby transport them. These left and right chains 53 for conveying the spacers constitute a spacer conveyor 57. The pitch of the pushers 56 is, in this embodiment, set at twice the distance between the adjacent support frames 12. These pushers 56 are so constructed to stop at the five positions between the adjacent support frames 12.

Figure 5:
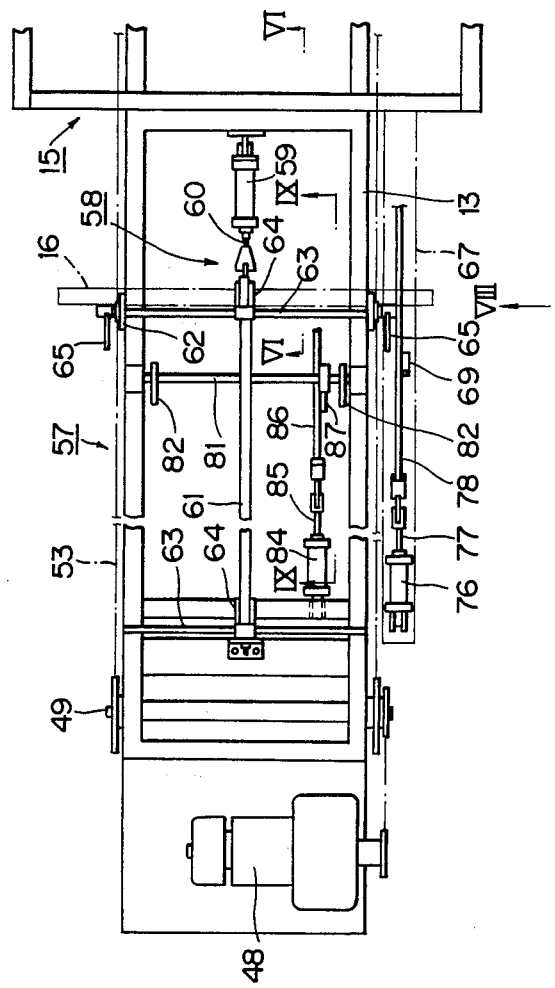
Figure 6:
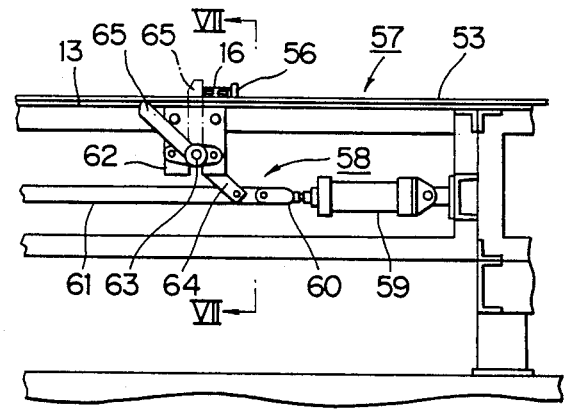

In FIGS. 5 and 6, a positioning mechanism for exactly positioning the spacers 16, which are stopped in predetermined positions after having been transferred by the pushers 56, is generally denoted by reference numeral 58. The positioning mechanism 58 comprises an air cylinder 59 pivotably connected to a center of the front end of the conveyor frame 13 and a rod 61 pivotably connected by its one end to an end of a piston rod 60 of the air cylinder 59. The other end of the rod 61 extends to the rear end of the conveyor frame 13 and is pivotably supported by a bracket (not shown). A plurality of lever shafts 63 are rotatably supported by respective pairs of bearings 62 rigidly secured to the conveyor frame 13 at positions adjacent to the above-mentioned five stop positions of the spacers 16. At the center of each lever shaft 63 rigidly connected thereto to the above-mentioned rod 61. Each lever shaft 63 also carries positioning levers 65 at the respective ends thereof, which protrude from the respective sides of the conveyor frame 13. As seen from FIG. 6, these levers 65 are inclined so that by a forward or leftward movement of the piston rod 60 of the air cylinder 59 from a position indicated in FIG. 6, the rod 61 is moved leftward and the inclined positioning levers 69 come to their upright positions to push the spacer 16, which has been provisionally positioned and stopped by the pusher 56, as mentioned above, against the pusher 56 so as to exactly position the spacer 16.

A transfer loading machine for joining a shape 2 received from the above-mentioned transfer machine 6 with the spacers 16 conveyed by the conveyor 57 and now stopped, and for loading them alternately on a pallet, will now be described in detail with reference to FIGS. 1, 2, 8 and 9. A plurality of transfer frames generally denoted by reference numeral 66 each comprises an elongated hollow rectangular frame body 66a having substantially the same length as each support frame 12, a plurality pairs of side plates 66b extending downward therefrom at several positions in the longitudinal direction, bearings 66c each supported by the pair of side plates 66b, and pairs of rollers 66d supported by the respective bearings 66c. These rollers 66d are engaged with the pair of rails 12a and 12b, respectively, of the support frame 12 so that the transfer or movable frame 66 can be moved by a driving means between a retracted position in which the the frame 66 is substantially located over the support frame 12 and a protruded position in which the frame 66 is projected from the support frame 12 to a loading position above the pallet 96 (FIG. 1), as described in detail hereinafter.

As seen from FIGS. 2 and 8, a beam 67 is arranged on the floor along and over the entire length of the elongated conveyor frame 13 at one side thereof. Five brackets 68 are rigidly secured to the beam 67 at predetermined intervals. To the respective brackets 68 pivotably attached are reversing levers 69, respectively, which correspond to the above-mentioned five positions in which the spacers 16 are stopped and arranged at positions in the vicinity of the transfer frame 66 of the corresponding five positions as mentioned above. Each transfer frame 66 carries a pair of bearings 70 at a position corresponding to the spacer 16 for supporting a pair of spacer arms 71 via an arm shaft 73 so as to be pivotable between a horizontal position shown by a solid line in FIG. 8 and an inclined position shown by a dotted line. The spacer arms 71 are each, however, urged to their horizontal state by of tension springs 72. The arm shaft 73 carries at its protruded portion a reversing shoe 74 which is urged by the tension spring 72 so that a roller 75 attached to the reversing shoe 74 at the top end thereof is almost in contact with the reversing lever 69. As seen from FIG. 8, an air cylinder 76 is pivotably connected to the rear end of the beam 67. A rod 78 is pivotably connected by its one end to a piston rod 77 of the cylinder 76 and extends to the front end of the beam 67 to be slidably supported by its other end. Each of the above-mentioned reversing levers 69 is pivotably connected to the rod 78 by a conventional connnecting means consisting of an elongated slot and a pin, so that by retracting the piston rod 77 of the air cylinder 76 rightward from a position shown in FIG. 8, all the reversing levers 69 are simultaneously pivotably moved in the clokwise direction via the rod 78 to pivotably move the respective spacer arms 71 through the respective reversing shoes 74 to their inclined position for receiving the spacers 16.

Figure 7:
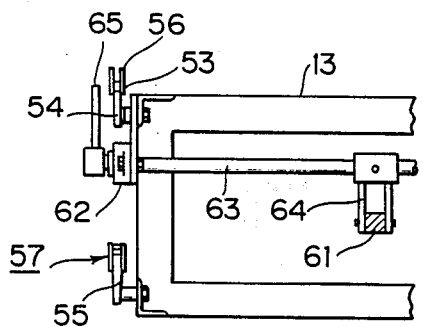
Figure 9:
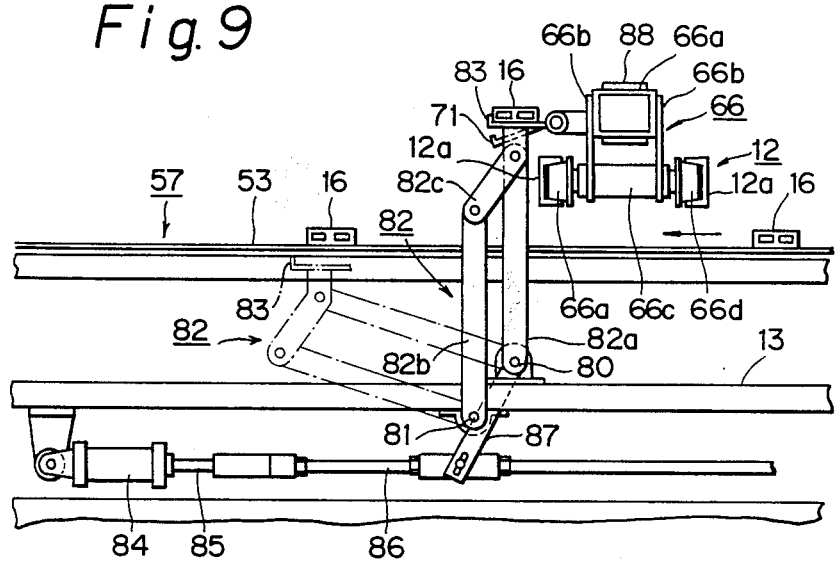

In FIG. 9, under each of the spacer arms 71 a rink shaft 80 is rotatably supported by its respective ends to the conveyor frame 13. In addition, a pair of pins 81 are mounted on the left and right side members of the conveyor frame 13 and adjacent to each link shaft 80. A pair of left and right parallelogram-shaped link means 82 each comprises a first link member 82a pivotally supported on the conveyor frame 13 by means of pin 80, a second link member 82b pivotably supported on the conveyor frame 13 by means of the pin 81, and an obtuse angle L-shaped third link member 82c pivotably connected at its respective ends to the top ends of the first and second link members 82a and 82b, respectively. A spacer receiver 83 is fixed to the pair of third link members 82c for receiving the spacers 16. As seen from FIG. 9, an air cylinder 84 is pivotably connected to the rear end of the conveyor frame 13 and its piston rod 85 is pivotably connected to a rod 86 which is extended to the front end of the conveyor frame 13 and slidably supported by the other end thereof. The rod 86 is connected to the respective link shafts 80 via respective levers 87. Each lever is fixed to the link shaft 80 and pivotably connected to the rod 86 by means of a conventional connecting means consisting of an elongated slot and a pin. By the forward or leftward movement of the piston rod 85 of the air cylinder 84 in FIG. 9, each pair of link means 82 are pivotably moved in the clockwise direction from a position indicated by a dotted line to a position indicated by a solid line via the rod 86 and lever 87. During such a movement of the link means 82, the respective spacer receivers 83 are simultaneously raised, while maintaining their horizontal state, to positions corresponding to the positions of the above-mentioned spacer arms 71 (FIG. 7).

In FIG. 2, the transfer or movable frame 66 is provided at its front and rear ends with belt pulleys 84 and 85. The support frame 12 is provided with a driving pulley 86 and a pair of guide pulleys 87. A transfer belt 88 is extended over these pulleys 84, 85, 86, and 87. The transfer frame 66 is also provided with a stopper or locking means, not illustrated in the drawings, for preventing the movement thereof, so that, where the transfer frame 66 is in the locked position, if the driving pulley 86 is rotated, only the belt 88 runs, while the belt pulleys 84 and 85 are prevented from moving in the longitudinal direction with respect to the support frame 12. Alternatively, when the transfer frame 66 is released, if the driving pulley 86 is rotated in one or another direction, the transfer frame 66 is moved back and forth, while the transfer belt 66 is itself free from running. Each of the above-mentioned inspection tables 11 is provided with another transfer belt, not illustrated, running in the longitudinal direction with respect to the table 11. The running support surface of this belt is somewhat higher than that of the transfer belt 88 of the movable frame 12, so that when both of these transfer belts are simultaneously running, the shape 2 on the inspection tables 11 is first conveyed by these transfer belts of the tables 11 and then transferred to the transfer belts 88 of the frames 12.

A stacker for shapes 2 and spacers 16 will now be described with reference to FIGS. 1 and 2. At the rear position of the above-mentioned transferring means, a pit 89 is provided in the floor, in which is fixedly situated an elongated machine base 90 extending perpendicular to the sheet surface of FIG. 2, which has five pairs of vertical lifter bearings 91 at the respective sides thereof corresponding to the spacers 16 which are supported by the respective spacer arms 71, as mentioned above. The respective lifter bearings 91 vertically slidably support respective spacer lifters 94 each having a rack which engages with each of pinions 93 (FIG. 1) fixed on a pair of pinion shafts 92, so that by rotating these pinion shafts 92 in either direction, all the spacer lifters 94 can be simultaneously slidably moved up or down. In FIG. 1, one of the pinion shafts 92 is rotated by a motor 99 which is operatively connected thereto and also connected to the other pinion shaft 92 through several connecting shafts 101 and some pairs of bevel gears 100. Each of the spacer lifters 94 (FIG. 2) is provided at the top end thereof with spacer holders 95 each having a projection for receiving spacers, so that each pair of spacer holders 15 can be turned over about 90° from a position to be parallel to each other on a same line so as to hold the spacer, to a position so as to release the spacer.

A pallet 96 comprises a bottom plate 96a having a length substantially the same as that of the shapes 2, several pairs of small width side plates 96b vertically provided at the respective sides of the bottom plate 96a, and some pairs of wheels 97 for running along a pair of rails 98 to move the pallet 96 to or from the machine base 90. When the pallet 96 is in a predetermined position on the machine base 90, shape 2 and spacers are alternately stacked on the pallet 96.

The operation of the stacker will now be described with reference to FIGS. 10A to 10H and other drawings already referred to hereinbefore.

Figure 10A:
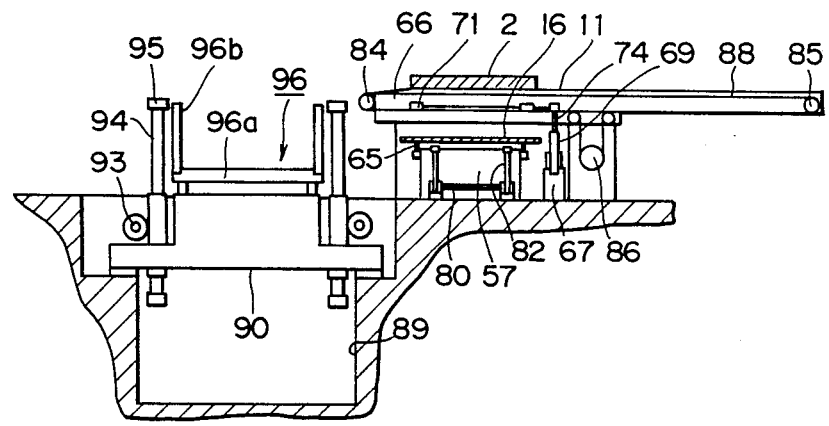

As mentioned above, an elongated shaped material extruded from an extruding press (not shown) and conveyed onto the standard length table 3 (FIG. 2) is cut by the hot saw 5 into individual elongated shapes 2 each having a predetermined length, which are then placed, in turn, side by side on the table 3. When a predetermined number of shapes 2 are placed in line, the transfer machine 6 (FIG. 2) is operated to drive the conveyor belts 8 and 9, so that the shapes 2 are conveyed one by one in the direction of an arrow A in FIG. 1 perpendicular to the longitudinal direction thereof and transferred onto the inspection tables 11. The shapes 2 are further moved by the transfer belt of the table 11 to a position just above the conveyor frame 13 where the shapes 2 are stopped with the trasnfer belt, as illustrated in FIG. 10A.

As mentioned above, the cassette box 17 of the spacer supplying machine 14 which accommodates therein several piles and rows of spacers 16 is in a retracted position as shown by a solid line in FIG. 3. In this state, the receiving plate 33 is in its raised position, as shown by dotted lines in FIG. 4, to support the foremost spacers 16. The pair of spacer receivers 22 also support the respective ends of the lowest spacer 16. In this state, the pair of air cylinders 26 are operated to move their piston rods 27 forward so as to pull the pair of spacer receivers 22 outward, so that the spacers 16 are released therefrom by their respective ends. The receiving plate 33 is then lowered by the piston rod 32 of the air cylinder 31, so that the foremost spacers 16 come down along the pair of guide plates 38 to be supported on the pair of lower racks 42 by the respective ends of the spacers 16. The receiving plate 33 is then further lowered slightly to a position shown by a solid line in FIG. 4 to be away from the spacers 16. The pair of pinions 45 are then rotated, so that the pair of upper racks 44 moves inward to hold the second lowest spacer 16 by inserting the pair of spacer holders 46 into the respective hollow end portions of the spacer 16. At the same time, the pair of lower racks 42 are retracted outward to release the lowest spacer 16 to allow it fall onto the pair of spacer receivers 47. The spacer 16 on the receivers 47 is pushed and transported by the corresponding pair of pushers 56 projected from the respective conveyor chains 53. The subsequent spacers 16 fall down one after another and the subsequent pairs of pushers 56 come one pair after another at a timing corresponding to the spacers 16, which are intermittently conveyed one by one at a predetermined interval. When five spacers 16 come to their respective predetermined positions as shown in FIG. 1, the conveyor chains 53 are stopped. In this state, the piston rod 61 (FIG. 6) of the air cylinder 59 is moved forward to the left from a position shown in FIG. 6 so as to turn the positioning levers 65 in the clockwise direction, so that the spacers 16 are pushed against the respective pairs of pushers 56 to be exactly positioned. FIG. 10A illustrates this stage of operation.

Figure 10B:
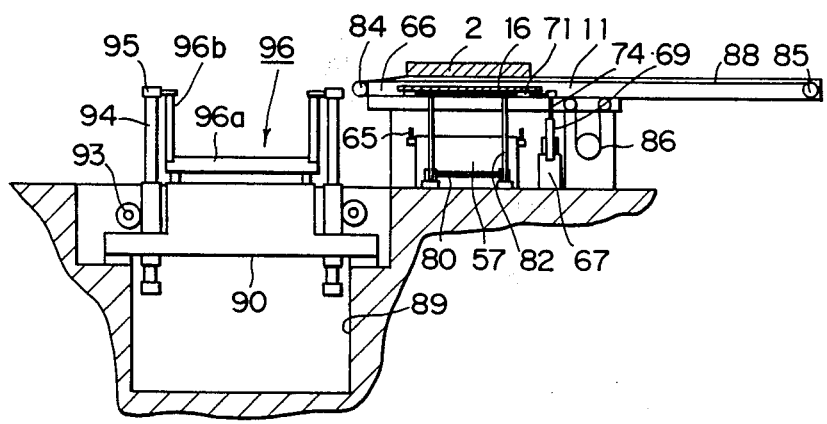

The piston rod 77 of the air cylinder 76 shown in FIG. 8 is then retracted to the left so as to turn the pair of reversing shoes 74 through the rod 78 and pair of reversing levers 69 to a position indicated by dotted lines in FIG. 8, thereby the respective spacer arms 71 are inclined. The piston rod 85 of the air cylinder 84 shown in FIG. 9 is then retracted to the left to a position shown in FIG. 9, so that the respective links 82 are pivotably moved to a position indicated by a solid line, while each of the spacer receivers 71 suppport the corresponding spacer 16. During this operation, the spacer holder 83 is kept in its horizontal position by the link means 82 and the corresponding spacer receiver 71 is inclined so as not to prevent the path of the spacer being raised up. After the spacers 16 are raised up, the piston rod 77 (FIG. 8) of the air cylinder 76 is moved forward to the right to return each of the spacer receivers 71 to its horizontal position, so as to support the spacer 16 thereby. At the same time, the piston rod 85 (FIG. 9) of the air cylinder 84 is moved forward to the right to return the respective spacer receivers 83 to a position indicated by dotted line in FIG. 9. FIG. 10B illustrates this state of operation in which the spacers 16 are raised up as mentioned above.

Figure 10C:
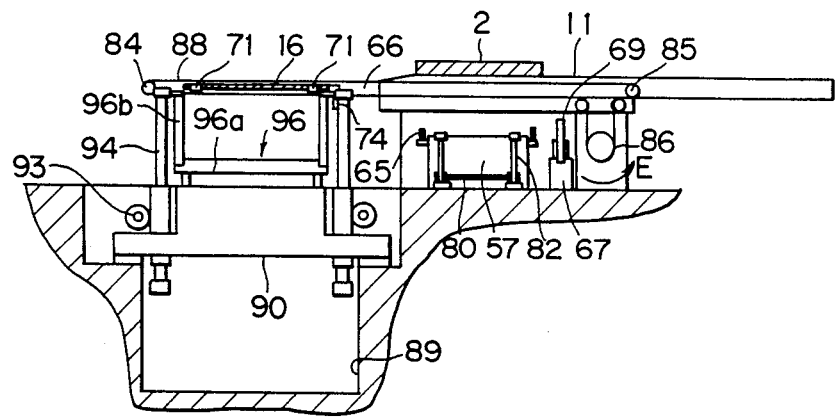

After the spacers 16 are thus held by the spacer arms 71 of the transfer frame 66, this frame 66 is unlocked and the driving pulley 86 (FIG. 2) is rotated, so that the transfer frame 66 is moved forward to a position, as shown in FIG. 10C, where the spacers 16 are located just above the pallet 96.

In this state, the shape 2 is a little away from the transfer belt 88 and remains on the inspection table 11, since the running surface of the transfer belt provided on the table 11 is positioned a little higher than that of the transfer belt 88.

Figure 10D:
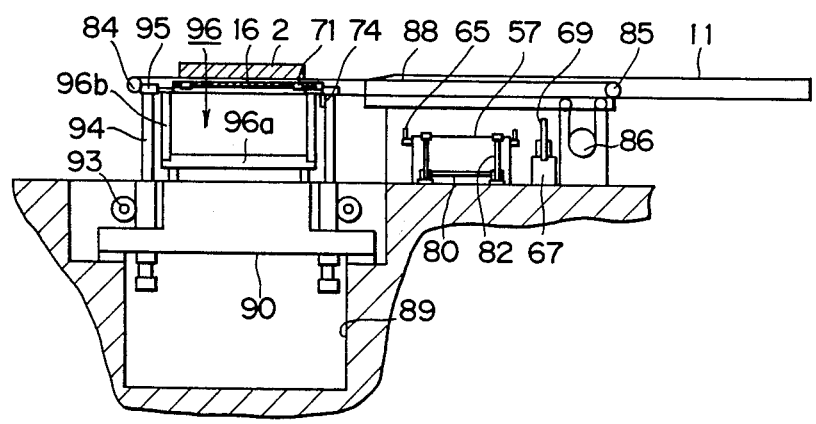

The transfer belt (not shown) of the table 11 is then driven and at the same time the driving pulley 86 is rotated in the counterclockwise direction, as shown by arrow E in FIG. 10C, after the transfer frame 66 is locked so that it does not to move in its longitudinal direction, so that the transfer belt of the table 11 and the belt 88 of the transfer frame 66 simultaneously run to transfer the shape 2 therebetween to carry it to a stacking position just above the spacers 16, as illustrated in FIG. 10D.

Figure 10E:
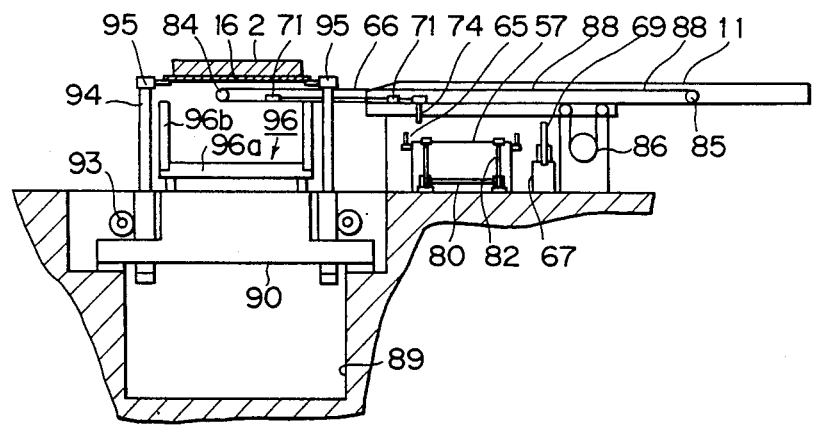

As understood from FIG. 10E, the respective pairs of spacer holders 95 are turned so as to hold, by their projected portions, corresponding spacers 16 and shape 2, and at the same time the respective pairs of spacer lifters 94 are slightly raised up by rotating the respective pairs of pinions 93. The transfer frame 66 is retracted to the right in FIG. 10E by rotating the drive pulley 86 in the opposite direction.

Figure 10F:
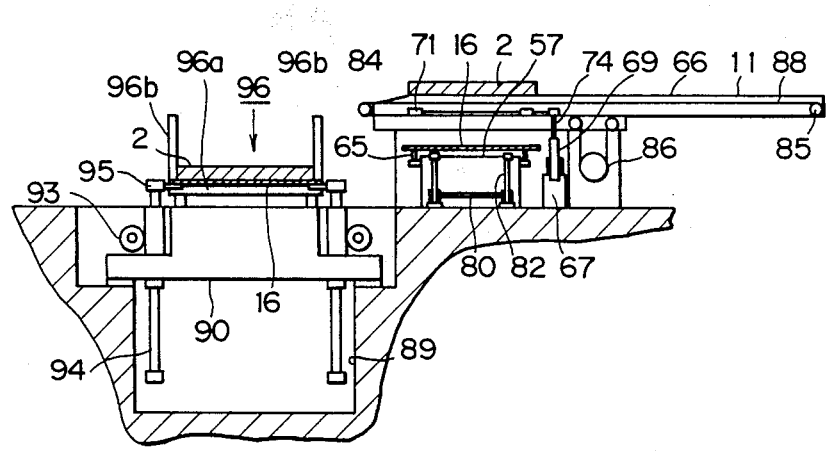

The spacer lifters 94 are then lowered, as shown in FIG. 10F, by rotating the pinions 93 in the opposite direction, and the spacer holders 95 are turned to release the spacers 16 to allow the spacers 16 and the shape 2 be stacked on the bottom plate 96a of the pallet 96. Meanwhile, the subsequent shape 2 and spacers 16 are prepared above the spacers conveyor 57 as seen from FIG. 10F.

As shown in FIG. 10G, the spacer lifters 94 are raised up again and at the same time the spacers 16 are moved to the loading position. Then the operations as mentioned above with reference to FIGS. 10C to 10F are repeated, so that several groups of spacers 16 and several shapes 2 are alternately stacked on the pallet 96, as illustrated in FIG. 10H.

Although the shape 2 is illustrated as a flat plate in its cross-section in FIGS. 10A to 10H, it should be understood that the shape may have various simple or complicated configurations.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

We claim:

1. An apparatus for stacking elongated shapes, such as metal blocks, or the like, on a pallet and for inserting spacers between the individual adjacent shapes, comprising:

a plurality of elongated tables arranged in parallel to each other, each horizontally extending from a shape supplying station, said tables being adapted to support said shapes thereon which are supplied onto the tables one by one in a longitudinal direction of the tables which is perpendicular to a longitudinal direction of the shapes;

a spacer conveyor arranged under the tables and extending perpendicularly thereto for feeding spacers one by one from a spacer supplying machine located outside a region occupied by the tables, said spacer conveyor including means for simultaneously stopping the spacers at a predetermined number of first positions each located between the tables and means for simultaneously lifting the spacers to second positions adjacent the tables;

A plurality of elongated transfer frames each arranged in parallel to each of the tables and supported for movement in the longitudinal direction thereof from a retracted position to a projected position wherein each transfer frame is projected to a stacking station, said transfer frames each including means for receiving each of the spacers in the second position so as to bring said spacers to the stacking station;

a plurality of conveyor belts each extending along and movably supported on each transfer frame in the longitudinal direction thereof for feeding the shapes one by one from said tables to the stacking station; and loading means for loading a shape and a predetermined number of spacers onto the pallet at the stacking station, and repeating the same so as to make a stack comprised of several layers of the shapes, said loading means including spacer lifters having spacer holders for placing said shape and said spacers on the pallet or on the stack by slightly lifting said spacers from said receiving means of said transfer frames by means of said holders, retracting said transfer frames and then lowering said spacers on said holders.

2. An apparatus as set forth in claim 1, wherein each of said transfer frames is provided with means for locking the longitudinal movement thereof, and wherein each of said conveyor belts extends over at least a front and rear pulley mounted on said transfer frame and a driving pulley of a drive motor, so that when said transfer frame is released from a locked condition while the said conveyor belt is driven, said transfer frame is allowed to move between its retracted and projected positions so as to transfer the spacer from said second position to the stacking station, and so that when the transfer frame is locked while the conveyor belt is driven, said conveyor belt feeds the shapes forward to the stacking station.

3. An apparatus as set forth in claim 2, wherein each of said tables is provided with its own conveyor belt extending in the longitudinal direction thereof, an upper surface of said table conveyor belt being slightly higher than that of each of said conveyor belts of the transfer frames, wherein when the spacer is transferred from the second position to the stacking station, the table conveyor belt can be stopped to allow the shapes to remain thereon without contacting the conveyor belt of the transfer frame.

4. An apparatus as set forth in claim 1, wherein each of said spacer holders of said lifters can be moved between a holding position for holding said spacers and a release position for releasing said spacers.

* * * * *